(12) United States Patent
Steinborn et al.

(10) Patent No.: US 9,008,925 B2
(45) Date of Patent: Apr. 14, 2015

(54) METHOD FOR CONTROLLING A GEAR BRAKE FOR AN AUTOMATED CHANGE-SPEED GEARBOX

(75) Inventors: Mario Steinborn, Friedrichshafen (DE); Jochen Breuer, Tettnang (DE); Christoph Ruechardt, Bodolz (DE); Thomas Jaeger, Meckenbeuren (DE); Roland Mair, Tettnang (DE); Melchor Moro-Oliveros, Riva del Garda (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 81 days.

(21) Appl. No.: 14/007,706

(22) PCT Filed: Mar. 2, 2012

(86) PCT No.: PCT/EP2012/053593
§ 371 (c)(1),
(2), (4) Date: Sep. 26, 2013

(87) PCT Pub. No.: WO2012/136424
PCT Pub. Date: Oct. 11, 2012

(65) Prior Publication Data
US 2014/0019020 A1    Jan. 16, 2014

(30) Foreign Application Priority Data
Apr. 8, 2011  (DE) .......... 10 2011 007 079

(51) Int. Cl.
*G06F 7/00* (2006.01)
*F16H 61/68* (2006.01)
(Continued)

(52) U.S. Cl.
CPC ........ *F16H 61/68* (2013.01); *F16H 2061/0411* (2013.01); *F16H 61/0403* (2013.01); *F16H 2059/425* (2013.01); *F16H 61/682* (2013.01)

(58) Field of Classification Search
None
See application file for complete search history.

(56) References Cited

U.S. PATENT DOCUMENTS

| 4,584,905 A | 4/1986 | Eschrich et al. |
| 4,742,461 A | 5/1988 | Eschrich et al. |

(Continued)

FOREIGN PATENT DOCUMENTS

| DE | 31 36 725 A1 | 3/1983 |
| DE | 10 2004 045 828 A1 | 4/2006 |

(Continued)

OTHER PUBLICATIONS

European Office Action issued in corresponding European Patent Application No. 12 707 543.0 mailed Nov. 20, 2014.

(Continued)

*Primary Examiner* — Calvin Cheung
(74) *Attorney, Agent, or Firm* — Davis & Bujold, P.L.L.C.; Michael J. Bujold

(57) ABSTRACT

A method of controlling a transmission brake of an automated change-speed transmission having a control cylinder, that is pressurized by inlet and outlet valves, and an upstream main cut-off valve by which a nominal pressure, supplied to the control cylinder, is regulated. Functional deviations of the transmission brake can be considered during a shifting operation, when the transmission is in neutral, the motor coupling clutch is disengaged and the transmission brake is engaged. The rotational speed gradient and the mass of the transmission components to be braked are determined and used to calculate the current braking torque of the transmission brake. The current braking torque relates to the current regulated nominal pressure, and the determined values are stored in a control unit and used during subsequent actuation of the transmission brake.

8 Claims, 1 Drawing Sheet

(51) Int. Cl.
   *F16H 61/04* (2006.01)
   *F16H 59/42* (2006.01)
   *F16H 61/682* (2006.01)

(56) References Cited

U.S. PATENT DOCUMENTS

| | | | |
|---|---|---|---|
| 7,108,633 B2* | 9/2006 | Hasegawa et al. | 477/70 |
| 8,078,370 B2 | 12/2011 | Petzold et al. | |
| 2008/0065300 A1 | 3/2008 | Petzold et al. | |
| 2011/0021315 A1 | 1/2011 | Dobele et al. | |
| 2013/0296134 A1* | 11/2013 | Petzold et al. | 477/94 |

FOREIGN PATENT DOCUMENTS

| | | |
|---|---|---|
| DE | 10 2006 040 476 A1 | 3/2008 |
| DE | 10 2007 018 967 A1 | 10/2008 |
| DE | 10 2008 001 686 A1 | 11/2009 |

OTHER PUBLICATIONS

German Search Report Corresponding to 10 2011 007 079.6 mailed Oct. 4, 2011.
International Search Report Corresponding to PCT/EP2012/053593 mailed May 7, 2012.
Written Opinion Corresponding to PCT/EP2012/053593 mailed May 7, 2012.

* cited by examiner

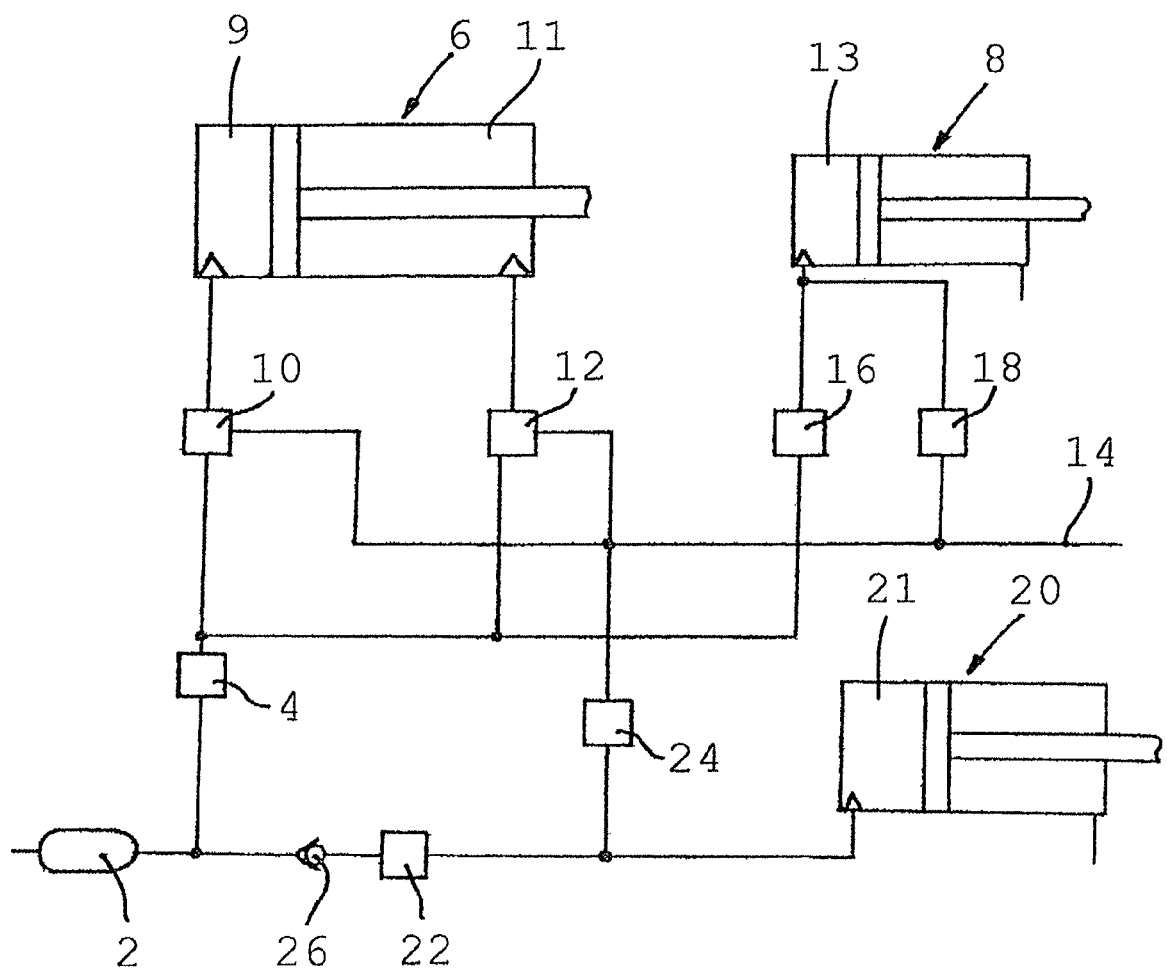

METHOD FOR CONTROLLING A GEAR BRAKE FOR AN AUTOMATED CHANGE-SPEED GEARBOX

This application is a National Stage completion of PCT/EP2012/053593 filed Mar. 2, 2012, which claims priority from German patent application serial no. 10 2011 007 079.6 filed Apr. 8, 2011.

FIELD OF INVENTION

The invention concerns a method for controlling a gear brake for an automated change-speed gearbox.

BACKGROUND OF THE INVENTION

Automated transmissions have long been used in various types of motor vehicles. The shifting movements for engaging gears, for actuating clutches and transmission brakes, are usually effected by pressure-medium-actuated control cylinders.

Such transmissions at least in part use the reservoir pressure of a vehicle in which they are fitted. The shifting elements, i.e. the main cut-off valves and the shifting valves arranged downstream therefrom, are either connected directly to this reservoir pressure or system pressure of the vehicle, or supplied with a constant operating pressure that is reduced for example by pressure-reducing valves or the like. This means that the loading of the shifting elements, the shifting times, the shifting noise, etc., cannot be influenced or can only be so to a small extent. Particularly in the case of transmission brakes, the problem arises that their function is affected by a production-related scatter, so that their control is problematic and the reliability and precision desired for efficient shifting cannot always be achieved.

From DE 10 2008 001 686 A1 a method for controlling shifts in an automated change-speed transmission is already known, in which the function of a transmission brake with a substantially constant braking torque is assisted by briefly closing the automatically controllable separator clutch in the event of a deviation from a nominal value caused for example by current environmental or operating temperatures or by the wear condition of the friction linings. However, this measure does not make it possible to determine and modulate the current actual braking torque or its deviation from the nominal braking torque.

SUMMARY OF THE INVENTION

Against this background the purpose of the present invention is to propose a method for controlling a transmission brake in an automated change-speed transmission, with which method the actual braking torque of the transmission brake at a specified operating pressure can be determined and this knowledge can be used for subsequent brake actuations.

The invention is based on the recognition that the rotational speed variation of braked known masses of the transmission or even a known torque of the drive engine acting in opposition to the braking action of the transmission brake, provides in each case a measure for determining the actual braking torque of the transmission brake.

Accordingly, a first variant of the invention starts from a method for controlling the operation of a transmission brake in an automated change-speed transmission that can be coupled by means of a separator clutch to a drive engine of a motor vehicle, with a control cylinder actuated by a pressure medium by virtue of associated inlet and outlet valves for the transmission brake, and with at least one main cut-off valve connected upstream from the inlet and outlet valves, by means of which a nominal pressure of a pressure medium supplied to the control cylinder can be regulated.

To achieve the stated objective, in this first variant it is provided that for a shifting operation when the transmission is in neutral, the separator clutch is open and the transmission brake is closed, the rotational speed gradient of the rotating transmission components to be braked by the transmission brake is determined, the mass of the transmission components to be braked during the shifting operation is determined, then with the help of the rotational speed gradient and the mass to be braked, the currently effective braking torque of the transmission brake is calculated, the current braking torque is associated with the current regulated nominal pressure, and the pair of values so determined, namely the nominal pressure and the braking torque, are stored in a data memory of a control unit and are used during actuations of the transmission brake that take place later, to control or regulate the braking action.

Thus, conversely, the nominal pressure required for a desired nominal braking torque can be determined and adjusted.

A second variant of the invention also starts from a method for controlling the operation of a transmission brake in an automated change-speed transmission that can be coupled to a drive engine of a motor vehicle by means of a separator clutch, with a control cylinder for the transmission brake which is pressure-medium-actuated by way of associated inlet and outlet valves, and with at least one main cut-off valve arranged upstream from the inlet and outlet valves, by means of which a nominal pressure-medium pressure supplied to the control cylinder can be regulated.

To achieve the stated objective, according to this second method variant it is provided that with the transmission in neutral, the separator clutch closed and the drive engine running at a specified, constant rotational speed, the torque of the drive engine is determined, then the transmission brake is closed by means of a specified nominal pressure-medium pressure, the increase of the drive engine's torque is determined as the current braking torque of the transmission brake, the current braking torque determined is associated with the current regulated nominal pressure, and the pair of values so determined, namely the nominal pressure and the braking torque, are stored in a data memory of a control unit and used during later actuations of the transmission brake for controlling or regulating its braking action.

According to a design of the first method variant it can be provided that the rotational speed gradient is measured by a time derivative of the rotational speed of the shaft to which the transmission brake is connected.

The value for the mass of the transmission components to be braked during each shifting operation is preferably obtained from a data memory of the control unit in which, with knowledge of the drive-train used in each case, these values have been stored.

Furthermore, in the context of the second method variant it can be provided that as the specified constant rotational speed of the drive engine the target speed for the selected gear is set. As is known, in upshifts a transmission brake is used for braking a transmission input shaft, so the target speed in the case of upshifts is lower than the rotational speed of the previous gear.

BRIEF DESCRIPTION OF THE DRAWING

To explain the invention further the description of a drawing is attached. The sole FIGURE shows schematically a shifting scheme for carrying out the control method according to the invention. The shifting system represented in the sole FIGURE, for example a pneumatic shifting system for shifting an automated change-speed transmission for utility vehicles, is supplied by a pressure medium supply system on the vehicle, which has a pressure medium reservoir 2 containing a pressure medium.

DETAILED DESCRIPTION OF THE PREFERRED EMBODIMENTS

In this case the shifting system comprises for example a main cut-off valve 4 arranged downstream from the pressure medium reservoir 2, which can connect the shifting arrangement that is arranged downstream from the main cut-off valve 4 to the pressure medium reservoir 2 or separate it therefrom.

In the case shown, the downstream shifting arrangement comprises two control cylinders 6 and 8, such that the first control cylinder 6 is a double-action control cylinder for selecting a gear or a shifting gate and the second control cylinder 8 is a one-side-acting control cylinder for actuating a transmission brake.

The two pressure chambers 9 and 11 of the first control cylinder 6 are in each case filled via a respective associated 3/2-way valve 10 or 12 and vented by way of a pressure medium outlet line 14, whereas the single pressure chamber 13 of the second control cylinder 8 is filled via a 2/2-way valve 16 and vented via a 2/2-way valve 18 by way of the pressure medium outlet line 14. The two valves 10, 12 are also referred to as shifting valves and the two valves 16, 18 as inlet and outlet valves respectively.

The shifting system also comprises a third, also single-action control cylinder 20 that serves to actuate a separator clutch with which the transmission can be connected to a drive engine. The single pressure chamber 21 of the third control cylinder 20 is filled via a 2/2-way valve 22 and vented by way of the pressure medium outlet line 14 via a 2/2-way valve 24. Upstream from the valve 22 for filling the clutch control cylinder 20 is arranged a one-way valve 26 in order to prevent venting of the clutch control cylinder 20 in the event of a failure of the pressure supply.

The current braking torque of the transmission brake actuated by the control cylinder 8 is determined as explained earlier. This braking torque is directly related to the current actuating pressure present in the pressure chamber 13 of the control cylinder 8. If there is a deviation between the expected and the actual braking torque, the braking torque of the transmission brake can be increased by increasing the pressure-medium pressure in the pressure chamber 13 by appropriate control means. To adjust the nominal braking torque of the transmission brake when a deviation from the actual braking torque is detected, the main cut-off valve 4 is opened until the nominal pressure that corresponds to the nominal braking torque is applied at the shifting valve 16 and hence in the pressure chamber 13 of the control cylinder 8.

Indexes

2 Pressure medium reservoir container
4 Main cut-off valve
6 Control cylinder
8 Control cylinder
9 Pressure chamber
10 3/2-way valve
11 Pressure chamber
12 3/2-way valve
13 Pressure chamber
14 Pressure medium outlet line
16 2/2-way valve
18 2/2-way valve
20 Control cylinder
21 Pressure chamber
22 2/2-way valve
24 2/2-way valve
26 One-way valve

The invention claimed is:

1. A method of controlling operation of a transmission brake in an automated change-speed transmission that is couplable by a separator clutch to a drive engine of a motor vehicle, the transmission brake is controlled by a control cylinder (8) that is pressure-medium-actuated by way of associated inlet and outlet valves (16, 18), and at least one main cut-off valve (4) is arranged upstream from the inlet and the outlet valves (16, 18) by which a nominal pressure, of a pressure medium supplied to the control cylinder (8), is controllable, the method comprising the steps of:

determining, with a control unit, a rotational speed gradient of rotating transmission components to be braked by the transmission brake, when in a shifting operation with the transmission in neutral, the separator clutch disengaged and the transmission brake engaged;

determining, with the control unit, a mass of the rotating transmission components to be braked by the transmission brake during the shifting operation;

calculating, with the control unit, a value of currently effective braking torque of the transmission brake from the determined speed gradient and the determined mass to be braked;

associating, with the control unit, the determined value of the current braking torque with a current regulated value of a nominal pressure;

storing the value of the nominal pressure and the value of the braking torque in a data memory of the control unit; and using the stored values of the nominal pressure and the braking torque, for either controlling or regulating braking action, during subsequent actuations of the transmission brake.

2. The method according to claim 1, further comprising the step of measuring the rotational speed gradient of the rotating transmission components as a time derivative of rotational speed of a shaft to which the transmission brake is connected.

3. The method according to claim 1, further comprising the step of obtaining a stored value of the mass of the rotating transmission components in each shifting operation from a data memory of the control unit.

4. The method according to claim 1, further comprising the step of setting the specified rotational speed of the drive engine as a target speed for a selected gear selected.

5. A method of controlling operation of a transmission brake in an automated change-speed transmission that is couplable by a separator clutch to a drive engine of a motor vehicle, the transmission brake is controlled by a control cylinder (8) that is pressure-medium-actuated by way of associated inlet and outlet valves (16, 18), and at least one main cut-off valve (4) is arranged upstream from the inlet and the outlet valves (16, 18) by which a nominal pressure, of a pressure medium supplied to the control cylinder (8), is controllable, the method comprising the steps of:

determining, with a control unit, torque of the drive engine when the transmission in neutral, the separator clutch is engaged and the drive engine is running at a specified constant speed;

engaging the transmission brake with a specified nominal pressure-medium pressure;

determining, with the control unit, an increase of the torque of the drive engine as a value of current braking torque of the transmission brake;

associating, with the control unit, the determined current braking torque with a value of a current regulated nominal pressure;

storing the value of the current regulated nominal pressure and the value of the current braking torque in a data memory of the control unit; and using the stored value of the current regulated nominal pressure and the stored value of the current braking torque, for either controlling or regulating braking action, during subsequent actuations of the transmission brake.

6. The method according to claim 5, further comprising the step of obtaining a stored value of the mass of the rotating transmission components in each shifting operation from a data memory of the control unit.

7. The method according to claim 5, further comprising the step of setting the specified rotational speed of the drive engine as a target speed for a selected gear selected.

8. A method of controlling operation of a transmission brake in an automated change-speed transmission that is connectable, via a separator clutch, to a drive engine of a motor vehicle, the transmission brake having a control cylinder actuated by a pressure medium that flows to and from the control cylinder via inlet and outlet valves so as to facilitate actuation of the transmission brake, and at least one main cut-off valve is arranged upstream of the inlet and the outlet valves for controlling a supply of the pressure medium, at a nominal pressure, to the control cylinder, the method comprising the steps of:

measuring as a time derivative of rotational speed of a shaft with which the transmission brake is connected, with a control unit, a rotational speed gradient of rotating transmission components to be braked by the transmission brake, during a shifting operation when the change-speed transmission is in neutral, the separator clutch is open and the transmission brake is closed;

obtaining, with the control unit, a stored value of mass of the rotating transmission components to be braked during each shifting operation from a data memory of the control unit;

calculating, with the control unit, a current braking torque value of the transmission brake from the rotational speed gradient and the mass of the rotating transmission components to be braked;

associating, with the control unit, the current braking torque value with a value of the nominal pressure of the supply of the pressure medium to the control cylinder;

storing the value of the nominal pressure and the current braking torque value in a data memory of the control unit; and using the value of the nominal pressure and the current braking torque value, for either controlling or regulating braking action, during subsequent actuation of the transmission brake.

* * * * *